United States Patent [19]
Rogers et al.

[11] Patent Number: 6,134,222
[45] Date of Patent: Oct. 17, 2000

[54] MULTIPLE U CHANNEL ISDN COMMUNICATIONS INTERFACE

[75] Inventors: Steven Rogers, Alton, N.H.; Brian Hoppes, Herndon, Va.

[73] Assignee: Video Network Communications, Inc., Portsmouth, N.H.

[21] Appl. No.: 08/938,149

[22] Filed: Sep. 26, 1997

[51] Int. Cl.[7] .................................................. H04L 12/16
[52] U.S. Cl. ........................................... 370/264; 370/420
[58] Field of Search .................................. 370/264, 259, 370/260, 269, 420, 261, 294, 540, 476; 455/414, 416, 560; 379/201, 202, 203, 204, 205, 206

[56] References Cited

U.S. PATENT DOCUMENTS

| | | | |
|---|---|---|---|
| 5,204,860 | 4/1993 | Sparks .................................... | 370/110.1 |
| 5,276,679 | 1/1994 | McKay et al. ............................. | 370/84 |
| 5,305,312 | 4/1994 | Fornek et al. ........................... | 370/264 |
| 5,787,087 | 7/1998 | Visser et al. ............................ | 370/420 |
| 5,815,505 | 9/1998 | Mills ....................................... | 370/264 |
| 5,845,211 | 12/1998 | Roach, Jr. ............................... | 455/560 |

OTHER PUBLICATIONS

Flegg R: "Computer Telephony Architectures: MVIP, H–MVIP, and SCBUS" IEEE Communications Magazine, vol. 34, No. 4, Apr. 1, 1996, pp. 60–64.

The Siemon Company, Network Stabling Standards, "UTP Cabling", taken from (www.siemon.com/utp.html) believed to be Mar. 1999.

Comstar Company, "Protectnet for ISDN", taken from (www.gy.com/spec/bvnp.htm) believed to be Mar. 1999.

*Primary Examiner*—Huy D. Vu
*Assistant Examiner*—Prenell Jones
*Attorney, Agent, or Firm*—Banner & Witcoff, Ltd.

[57] ABSTRACT

A method and apparatus is provided for interfacing a plurality of ISDN lines from a telephone company central office to equipment which transmits video data, such as videoconferencing equipment. A single telephone wiring jack is directly coupled to two, three, or four ISDN lines without conversion to S/T channels. The single telephone wiring jack is coupled to an interfacing device which converts each ISDN line format into a format compatible with the videoconferencing equipment, such as the Multi-Vendor Interface Protocol format. Rather than using conventional wiring pin-outs for the single telephone wiring jack, all pins of the jack may be allocated to carrying ISDN data. The inventive method and apparatus avoids the expense of various conversion devices and wiring of separate telephone jacks, and permits as many ISDN lines to be allocated as are needed to support a desired bandwidth.

22 Claims, 7 Drawing Sheets

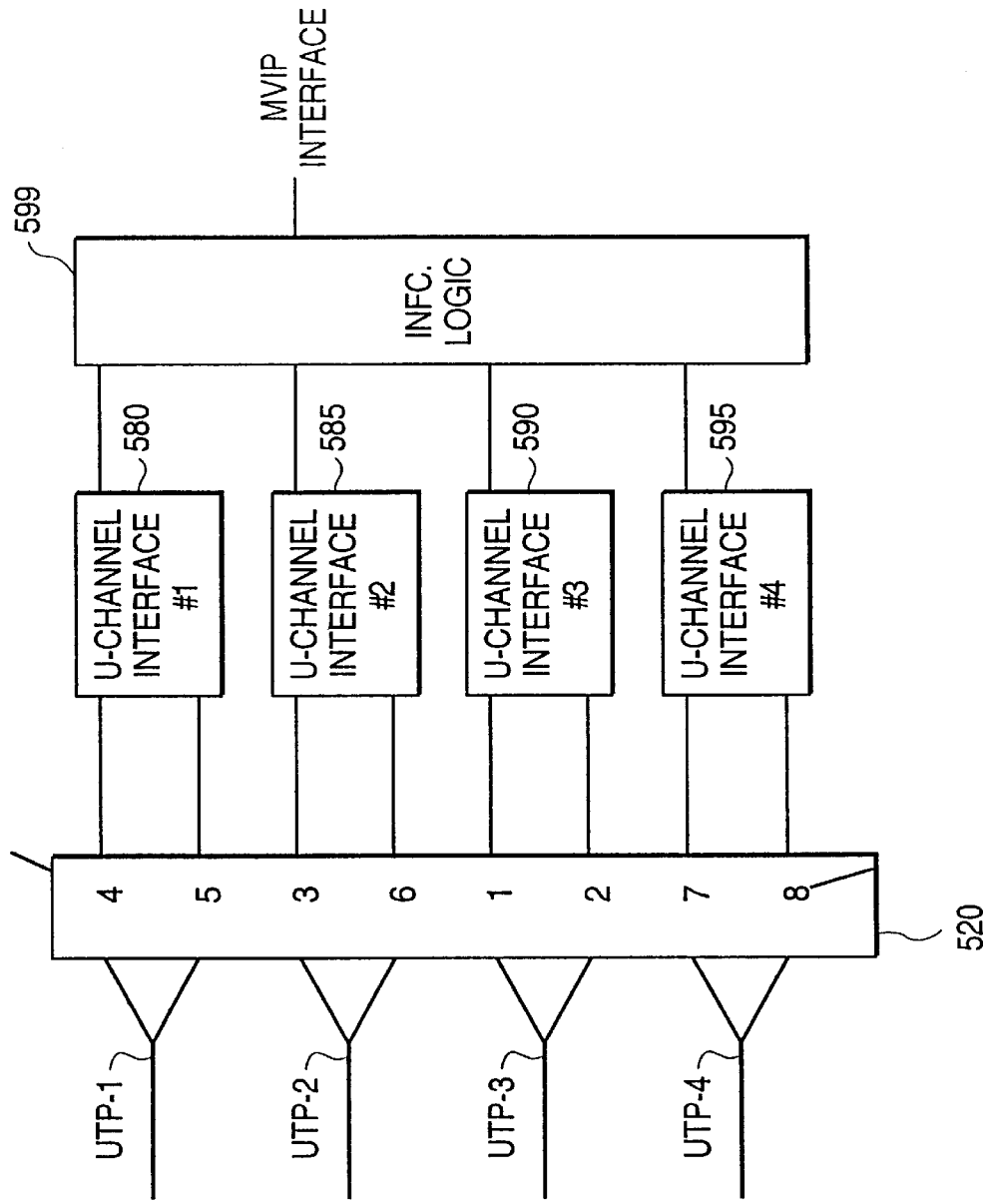

MULTIPLE U CHANNEL ISDN COMMUNICATIONS INTERFACE

BACKGROUND OF THE INVENTION

1. Technical Field

This invention relates generally to Integrated Services Digital Network (ISDN) interface devices. More particularly, the invention provides a technique for simplifying the bundling of ISDN lines within an office building to provide increased data bandwidths for video conferencing and other applications.

2. Related Information

An important application of ISDN (Integrated Services Digital Network) is the transmission of video conferencing data and other computer-to-computer data. A single ISDN line (a "Basic Rate Interface" or "BRI") typically includes two full-duplex channels referred to as "2B+D". The two B channels are for digital voice or data, and each supports a data rate 64 kilobits/second. The D channel is used to send and receive control messages from the telephone company's Central Office (CO) and supports a data rate of 16 kilobits/second. One ISDN line can actually carry two telephone calls simultaneously on each of the two B channels. Alternatively, ISDN lines can be used to transmit video data such as for a video conferencing application.

Videoconferencing users have found that a data rate of 64 kilobits/second is not sufficient for quality video transmissions. One prior art technique for increasing the data rate (and hence the video quality) has been to "bundle" two ISDN lines together for a single video conference call. Thus, for example, conventional videoconferencing equipment can use both B channels of an ISDN line simultaneously, effectively providing a video conferencing bandwidth of 128 kilobits per second.

However, human factors studies show that current discrete cosine transform based compression techniques using a bandwidth of 128 kilobits per second is still not enough to transmit a high quality video image. Although the video quality is improved over 64 kilobits/second, most business users still complain that the video images are too "jerky". Only 20% of typical users feel that 128 kilobit video is acceptable or useful. By increasing the data rate, the video can be improved further. In fact, the same studies have shown that at a bandwidth of 384 kilobits/second, 80% of potential users feel that the video is useful.

In order to obtain higher data rates with ISDN, it is necessary to combine more B channels. For a data rate of 384 kilobits/second, six B channels are needed, which requires three BRI (i.e., three ISDN lines).

A BRI is conventionally delivered by the telephone company to an office building or other user premises over a single unshielded twisted pair (UTP) of wires. All of the data, full-duplex 2B+D, is delivered over the single UTP using a sophisticated adaptive echo-cancellation system. This single UTP line is called a "U-channel".

Once the U-channel enters the user's premises, it is usually converted into an "S/T-Channel", which uses two UTP (i.e., two pairs of wires), one pair for transmitted data and the other pair for received data. Conversion from the U-channel to S/T-channel is conventionally performed with an electronic device called an "NT1" or Network Termination 1 device. This device normally has a separate power supply, one UTP input from the telephone company central office, and two UTP outputs which connect to the terminal equipment.

FIG. 1 shows a typical prior art installation of a single ISDN line or BRI. A customer office facility 101 is coupled to a telephone company central office 102 through a U-channel which, as explained above, comprises a single pair of unshielded twisted pair wires. In this configuration, the telephone company installs standard telephone wall jacks and four-pair cables to deliver the ISDN line to the user's terminal equipment 103, such as a videoconferencing terminal. Such videoconferencing terminals are well known and may include a computer, camera, and telephony interface devices to permit video and audio signals to be bidirectionally transmitted between users.

Conventional videoconferencing terminals may also include electronic equipment which combines multiple ISDN lines and B channels together to provide a 384 kilobit/second or faster data channel for the terminal. This combining system is called an "Inverse Multiplexer" or "IMUX" since it starts by splitting the wider bandwidth signals into 64 kilobit streams for transmission over the ISDN B channels.

FIG. 2 shows a conventional multi-line installation which permits multiple ISDN lines to be combined in order to increase the data rate to terminal equipment such as a videoconferencing terminal 203. However, as shown in FIG. 2, the telephone company must install new four-pair cables from the point of entry in the basement (one for each pair of S/T channels), NT1 devices 205, 206 and 207, and new jacks J1, J2 and J3 in the room with the terminal equipment. Thus, one new NT1 device, a new cable, and a new wall jack is needed for each additional ISDN line. The videoconferencing equipment uses six 64 kilobit per second S/T channels, combined to achieve 384 kilobits per second, to transmit video conferencing data.

The added equipment required to combine S/T channels results in extra expense. Moreover, the time required by the telephone company to install the equipment and additional telephone jacks results in additional labor costs. Consequently, a more efficient method of combining ISDN lines to achieve higher bandwidths is needed.

SUMMARY OF THE INVENTION

The present invention solves the aforementioned problems by providing an ISDN interfacing technique and method which uses a single telephone connector (such as an RJ-45 connector) to provide high bandwidth service over multiple U-channels within a user's premises such as an office building. The conventional S/T channels are avoided entirely in this approach. By placing multiple U-channel interfaces directly in the terminal equipment and by wiring the multiple U-channel pairs into a single RJ-45 connector, the system can be connected with only one cable instead of three or four cables required by conventional approaches. The reduced number of connections and wiring costs results in significant commercial advantages.

Additional features and advantages of the present invention will become apparent through the following detailed description, the figures, and the appended claims.

BRIEF DESCRIPTION OF THE DRAWINGS

FIG. 5 shows a U-channel cable connection per EIA/TIA-568A.

DETAILED DESCRIPTION OF THE PREFERRED EMBODIMENTS

Figure 1:
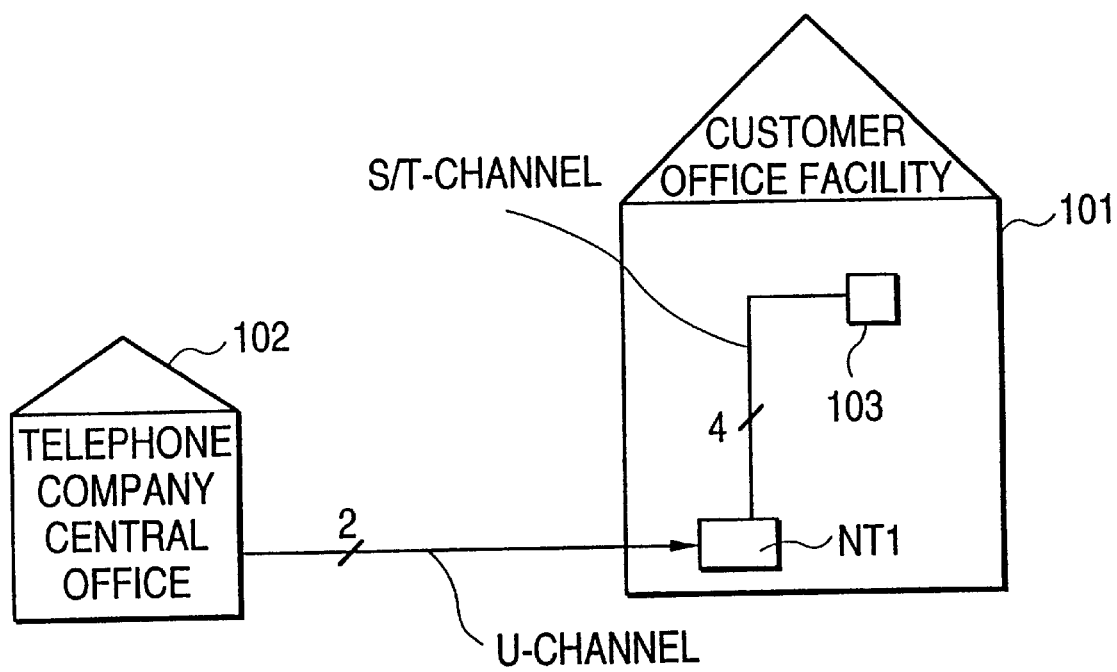
FIG. 1 shows a conventional ISDN connection to an office facility.
Figure 2:
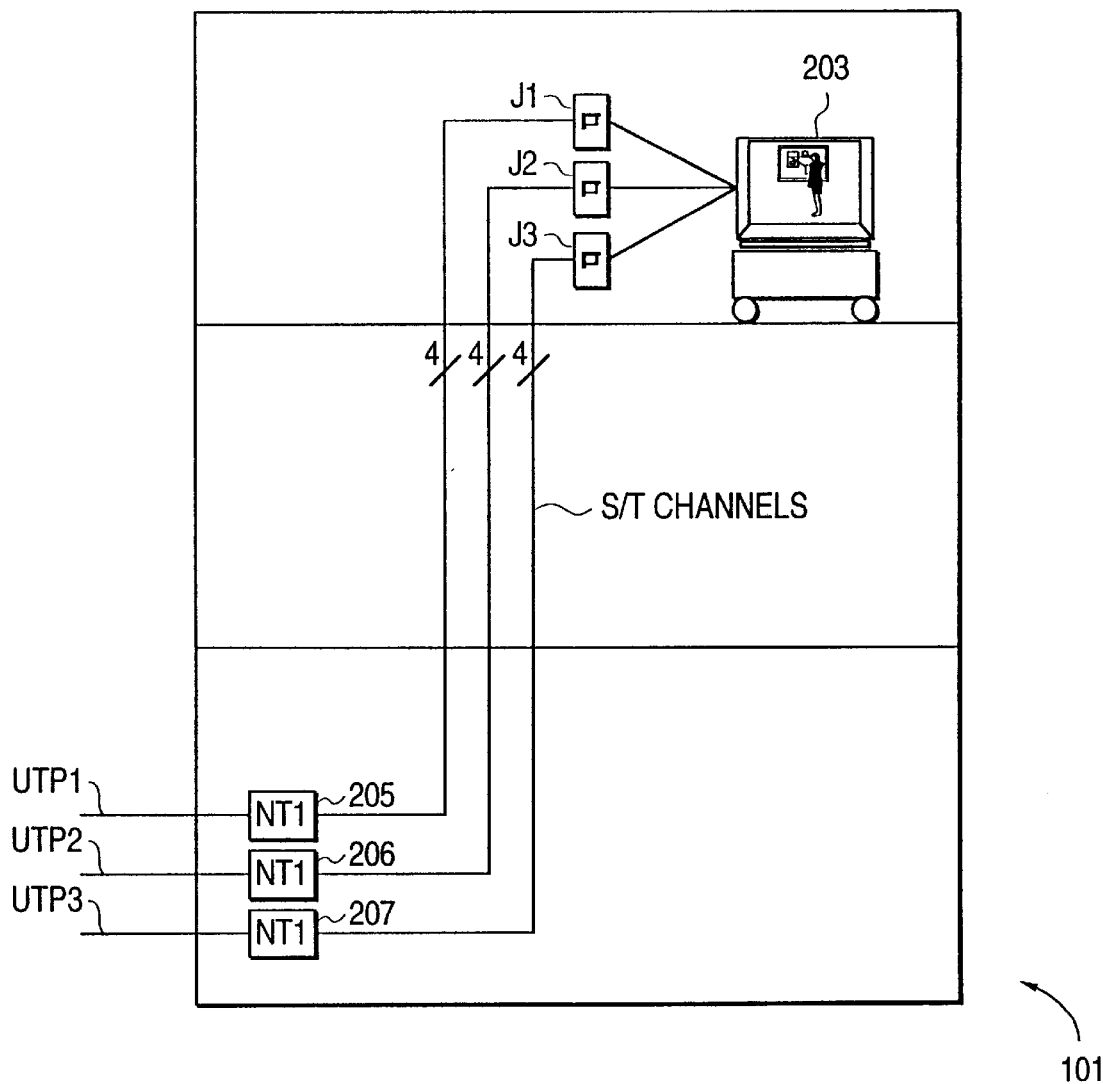
FIG. 2 shows a conventional ISDN line bundling technique for achieving increased data bandwidths over multiple ISDN lines.
Figure 3:
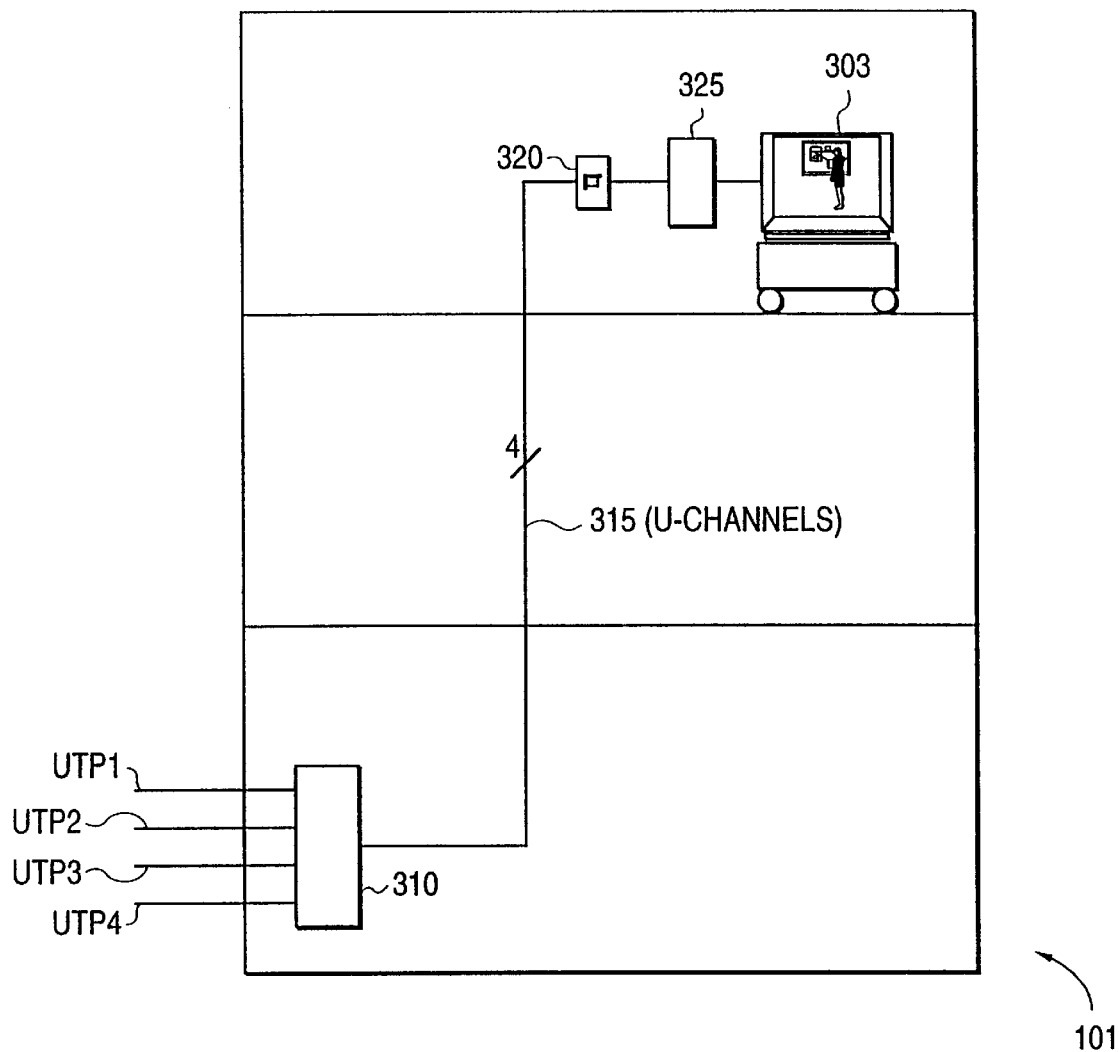
FIG. 3 shows a system employing a single four-pair telephone cable to transmit bundled ISDN data in accordance with one embodiment of the present invention.

FIG. 3 shows a system employing a single four-pair telephone cable (i.e., eight wires in a single cable) to transmit bundled ISDN data in accordance with one embodiment of the present invention. In contrast to conventional systems, up to four separate U-channels (i.e., using 8 wires) are used to transmit U-channel data directly from a building wiring block 310 to a standard RJ-45 telephone wall jack 320. Each of these U-channels directly couples to telephone company U-channels outside the building (UTP1 through UTP4), thus simplifying connections and eliminating the need for NT1 conversion devices.

An interface unit 325 combines the U-channels into a format suitable for terminal equipment such as a videoconferencing device implemented in a PC. One possible format is the multi-vendor interface protocol (MVIP), which is a well known interface for interconnecting digital telephone devices with computers. The terminal equipment 303, such as video conferencing equipment, is coupled to the interface unit 325 in accordance with the well known MVIP standard. Using the approach of FIG. 3, an installer need only patch the multiple single UTP U-channel cables from the telephone company's central office into the building's wire block 310. No NT1 devices are needed, and no S/T channels are needed.

Many new buildings already have a four-pair cable running to an RJ-45 connector in each office. In accordance with the present invention, an interface device 325 permits the user to connect a single four-pair jumper cable to the terminal equipment 303. The terminal equipment can make use of one, two, three or four U-channels, since there are four separate pairs in the cable from the basement.

Referring again to FIG. 3, one aspect of the present invention involves connecting premises wiring block 310 to as many as four UTP wires (each comprising a U-channel from the telephone company). The four UTP wires (each a pair, total of eight wires) are coupled through a single cable 315 to wall jack 320, which may comprise an RJ-45 eight pin jack such as jack 420 in FIG. 4. Four pairs of wires to the right of jack 420 each comprise the same U-channels which directly arrive from the telephone company, and are routed through various interface circuitry before being provided to the videoconferencing equipment such as equipment 303 of FIG. 3. As explained below, wall jack 420 and wiring block 310 may be wired in accordance with the pin-out diagram of FIG. 5. By patching cables in this manner, the U-channels will be matched to the ISDN interface unit 325 in the correct order.

By placing the multiple U-channel interfaces directly in the terminal equipment and by wiring the multiple U-channel pairs into a single RJ-45 connector, the system can be connected with only one cable instead of three or four cables required by other systems. This approach has the additional advantage that it is easier to disconnect or reconnect, since only one cable is involved. In contrast, systems which require three or four separate cables may result in an incorrect wiring order (e.g., only 1 chance in 6 for three cables and 1 in 24 for four cables that the cables will be correctly wired). Therefore, the present invention greatly enhances the ease of installation and use of multi-line ISDN installations.

Figure 4:
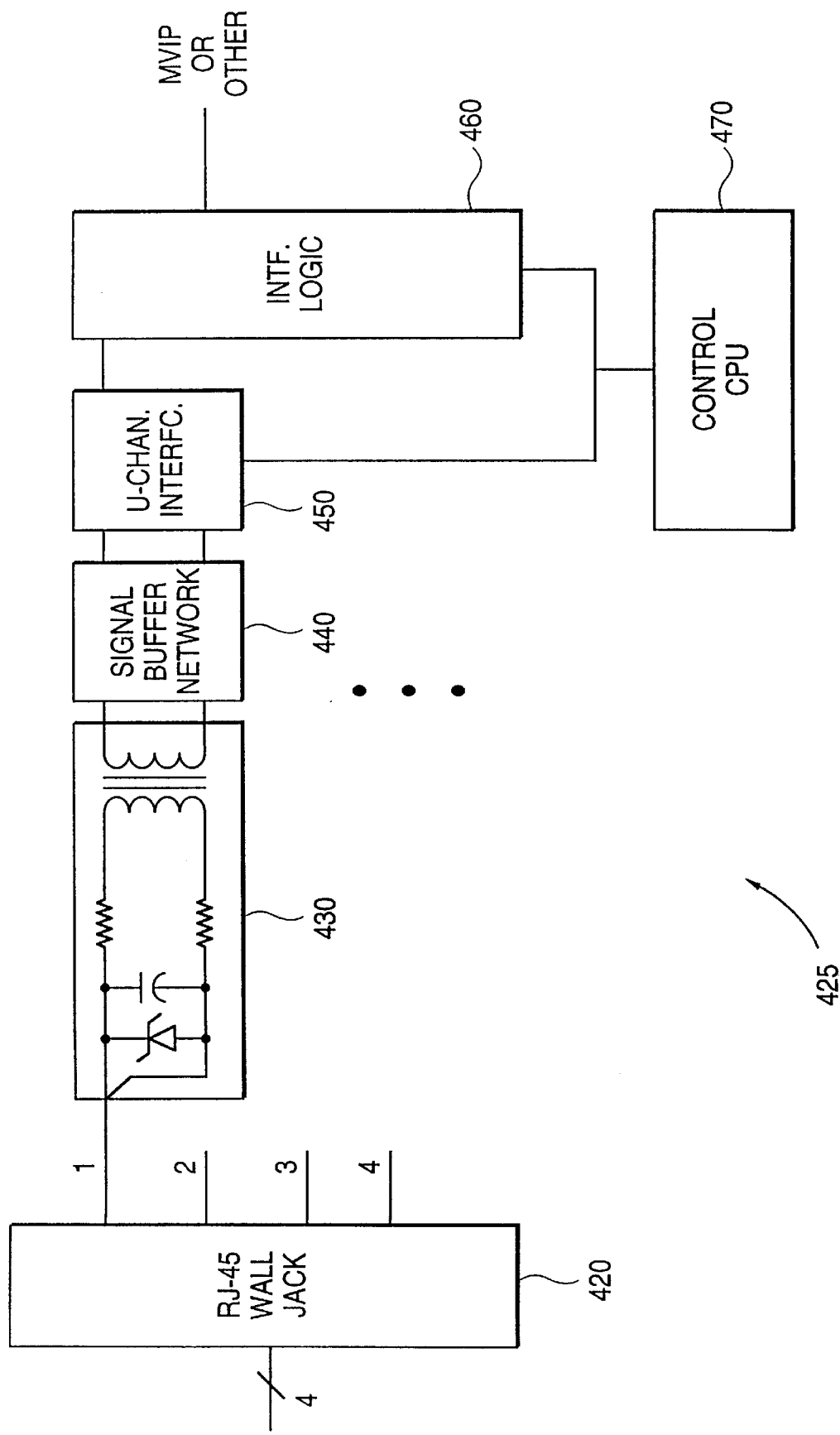
FIG. 4 is a block diagram of an ISDN interfacing technique according to one embodiment of the present invention.

FIG. 4 shows a block diagram of a system employing a U-channel to MVIP interface device according to one aspect of the present invention. A standard RJ-45 wall jack 420 receives four pairs of wires, typically bundled into one cable, from wire block 310 of FIG. 3. The RJ-45 connector includes 8 pins (four pairs), which are wired to support up to four separate U-channels. The eight pins of the RJ-45 jack are assigned per TIA/EIA-568A standards rather than ANSI T1.601 standards into four-pair on the cable side.

FIG. 5 shows how wall jack 420 can be wired using an EIA-568A pinout rather than the conventional ANSI T1.601, which specifies how a single U-channel interface is connected into a four-pair cable. In accordance with the conventional ANSI T1.601 standard, one pair of wires (i.e., two pins) are reserved for the U-channel and the other three pair are used for optional power connections. In the present invention, however, these power pins are instead used for additional U-channel interfaces.

Referring again to FIG. 4, each of the pairs of wires from jack 420 is routed through a surge protective network 430, a signal buffer 440, and a U-channel interface 450. The surge protective network prevents equipment damage, and signal buffer 440 performs line conditioning functions to eliminate noise. Such circuits can be constructed of transformers, filters and other well known circuit elements.

The U-channel interface function can be performed by a U-channel to digital interface IC, such as for example a Motorola MC 145572. The interface IC converts the U-channel data received from the telephone company directly into a 2B+D digital serial signal including two 64 kilobit data streams (clock and ground connection details are omitted from FIG. 4). This signal is then split, by interface logic 460, into separate 64 kilobit channels that are formatted in accordance with the Multi-Vendor Interface Protocol ("MVIP"), a well known standard for interconnecting digital telephony devices and systems. Thus, for example, if 256 kilobit data bandwidth is required, four 64 kilobit channels (two U-channels) can be used, and interface logic 460 can provide as output a digital signal comprising multiplexed data channels according to the MVIP standard.

Instead of the Multi-Vendor Interface Protocol, interface logic 460 may instead comprise a video encoder/decoder which decompresses the video data according to the well known H.320 standard and converts the data to a suitable data format such as NTSC. Such a circuit can be easily constructed using any of various well known components, or can be purchased commercially.

Figure 6A:
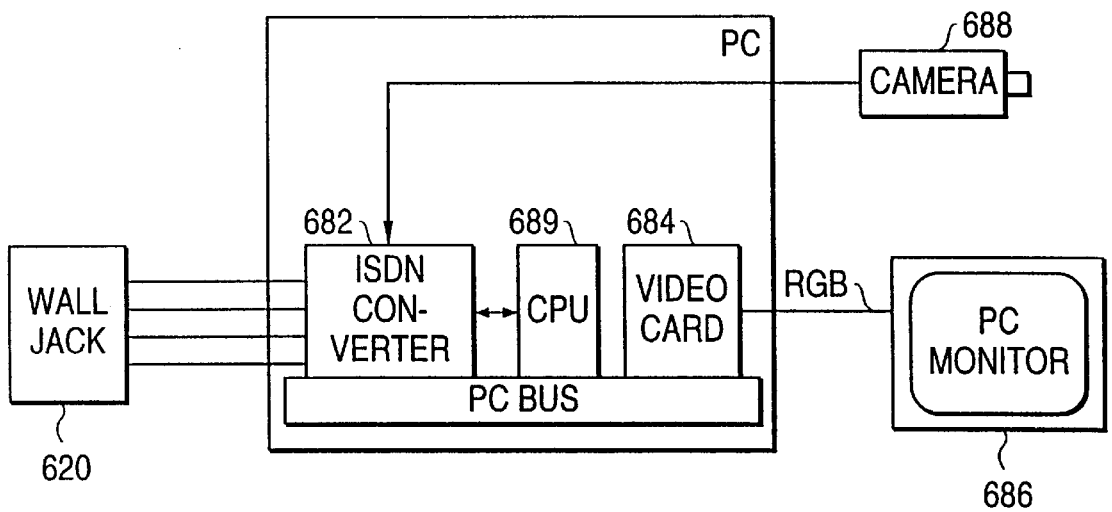
FIG. 6A shows one possible configuration for displaying video information from a wall jack on a computer display.

FIG. 6A shows one possible configuration for implementing various principles of the present invention. All of the components in FIG. 4 may be combined into a single PC-compatible board 682 for convenience. As shown, U-channel data lines from a wall jack 620 are fed to ISDN converter 682 which may comprise the elements shown in FIG. 4 combined into a PC-compatible board. ISDN converter 682 receives U-channel data from the wall jack, converts it to a standard video format, and provides it to a video card 684 which displays the data on a PC monitor 686. Software executing on control CPU 689 interacts with the CPU on ISDN converter 682 to set up the data channels. A camera 688 can be used to capture and transmit data in the reverse direction, and ISDN converter can be configured to transmit data as well as receive data over the lines.

Figure 6B:
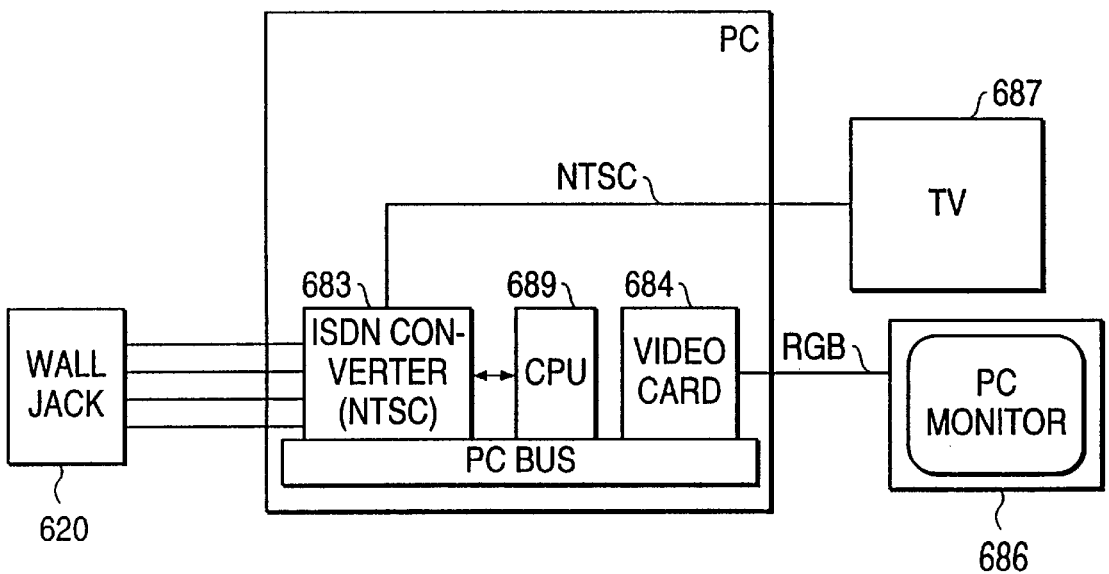
FIG. 6B shows one possible configuration for displaying video information from a wall jack on a television set.

FIG. 6B shows an alternate embodiment in which a different ISDN converter 683 generates NTSC data which is fed to a television 687 instead of a PC monitor. A user interface displayed on PC monitor 686 may still be used to coordinate the setting up and disconnection of telephone video conferences.

As shown in FIG. 4, the D channels of the ISDN lines are connected to a control CPU 470, which is responsible for communicating with the central office for call set-up and disconnect, for each of the BRI. Data transmission bandwidths may be selectable depending on the number of U-channels used. For example, two U-channels (pairs) may be used to achieve a bandwidth of 256 kilobits per second (2×128); three U-channels (pairs) may be used to achieve a bandwidth of 384 kilobits per second (3×128), or four U-channels may be used to achieve a bandwidth of 512 kilobits per second (4×128). Thus, control CPU 470 may be used to select the number of U-channels required based on a request made by the terminal equipment (not shown in FIG. 4).

Also, it will be appreciated that all components shown in the figures can be repeated at a receiving end, such that bi-directional video data is transmitted. Moreover, data may be transmitted at different bandwidths in each direction. For example, a corporate executive may demand high bandwidth reception while the other party to the videoconference call is provided with a lower resolution picture using fewer ISDN lines.

Figure 7:
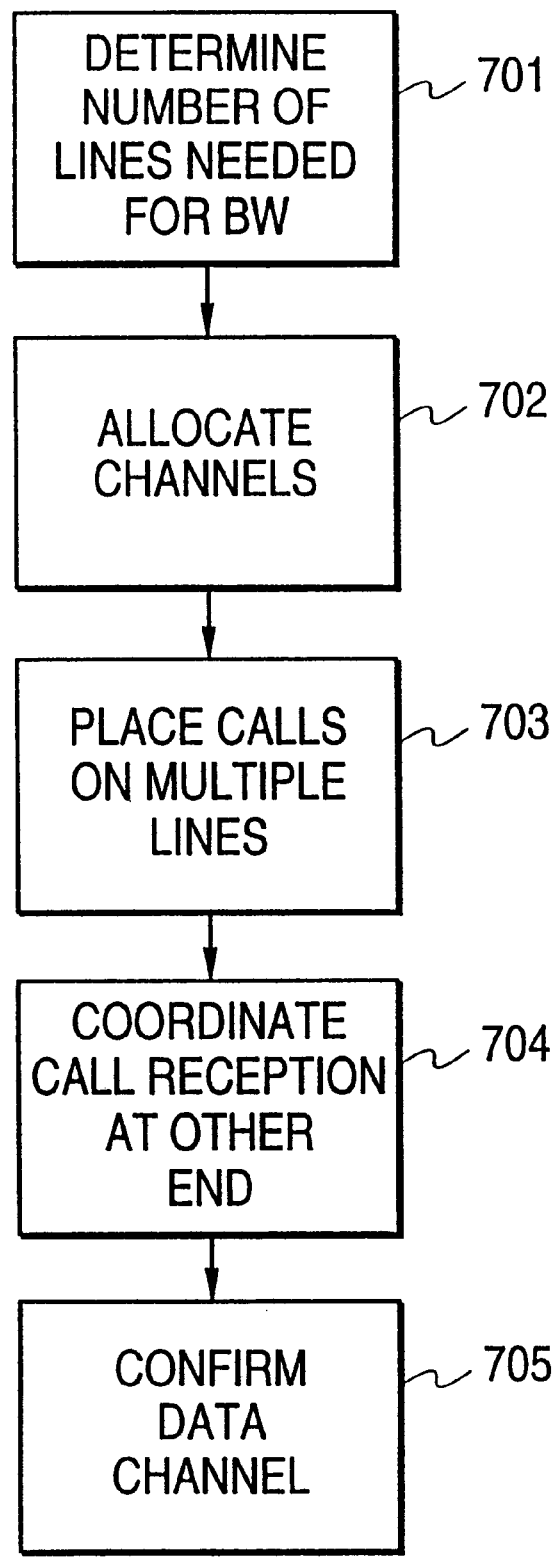
FIG. 7 shows steps which can be performed by a control CPU to communicate over multiple ISDN lines.

FIG. 7 shows a series of steps which can be performed by software executing in this CPU to coordinate the set-up of video telephone conference calls. In step 701, a determination is made based on the requested bandwidth (e.g., 256 kilobits, 384 kilobits, 512 kilobits) how many separate U-channels or ISDN lines are required. For example, two ISDN lines or U-channels are required for transmitting 256 kilobits per second. In step 702, the channels are allocated, ensuring that the appropriate number of U-channel interfaces are available. In step 703, multiple calls are placed on the requested number of ISDN lines. In step 704, handshaking protocol coordination occurs with a corresponding CPU at the receiver's end to set up the telephone call. Then, in step 705, data begins flowing across the ISDN lines and confirmation is provided to software executing in the terminal equipment.

FIG. 5 shows how a single telephone jack 520 can be wired to receive up to four UTP wires (each corresponding to a U-channel) and provide four separate outputs using a different pin-out standard (i.e., using TIA/EIA-568A) than the conventional ANSI T1.601 standard. Each U-channel interface unit 580 through 595 corresponds to elements 430, 440 and 450 of FIG. 4, and a single interface logic interface 599 and control CPU (not shown) may be shared among the multiple U-channel interface units.

The advantages of the multiple U channel interface are easier installation with fewer or no new cables to add, no NT1's to purchase or install, and it is easy for users to disconnect and reconnect equipment with only one cable.

It will be appreciated that the system of FIG. 4 may be implemented at two different user premises, such that a videoconferencing user located at one premises may place a call to a user at another premises.

It is apparent that many modifications and variations of the present invention are possible, and references to specific values are by example only. Switch ports, for example, can be either unidirectional or bidirectional. Various functions can be implemented in either hardware or software or a combination of both.

Reference numerals in the appended method claims identifying steps are for convenience only and are not intended to imply a necessary ordering of the steps. It is apparent that the method steps of the invention may be practiced in a different ordered sequence from that illustrated without departing from the scope of the invention. It is, therefore, to be understood that within the scope of the appended claims the invention may be practiced otherwise than as specifically described.

What is claimed is:

1. An interface for interfacing a plurality of U-channels each corresponding to a single ISDN line received from a telephone company central office to a piece of terminal equipment, comprising:

a plurality of U-channel interfaces each coupled to one of the plurality of U-channels, wherein the plurality of U-channel interfaces are adapted to be coupled to the plurality of U-channels through a single wall jack and each U-channel interface converts data received from one of the plurality of U-channels into two data channels and a control channel;

an interface circuit coupled between the plurality of U-channel interfaces and the terminal equipment, wherein the interface circuit converts each of the data channels from each of the plurality of U-channel interfaces into a standard compatible with the terminal equipment; and a control unit, coupled to the interface circuit, which receives a request from the terminal equipment for a high bandwidth data channel, and causes separate calls to be placed on each of the plurality of U-channels, wherein the number of U-channels used corresponds to a bandwidth required to support the videoconferencing equipment.

2. The interface according to claim 1, wherein the interface circuit converts each of the data channels into the Multi-Vendor Interface Protocol standard.

3. The interface according to claim 1, further comprising an 8-pin wall jack which runs to a premises wire block through a single 4-pair cable, wherein the pins of the wall jack are coupled to each of the plurality of U-channel interfaces according to the EIA/TIA-568A standard.

4. The interface according to claim 3, wherein the premises wire block is directly coupled to unshielded twisted pair (UTP) wires provided by the telephone company central office.

5. The interface according to claim 1, wherein the plurality of U-channel interfaces comprises four separate U-channel interfaces, each coupled to two pins of a single 8-pin telephone wall jack.

6. The interface according to claim 1, further comprising a surge protection network coupled between each of the plurality of U-channel interfaces and a telephone wall jack.

7. The interface according to claim 1, wherein the control unit in response to receiving a request for 128 kilobit/second bandwidth places at least one call over at least one of the pluarlity of U-channels.

8. The interface according to claim 1, wherein the control unit in response to receiving a request for 128 kilobit/second bandwidth places two calls over two of the plurality of U-channels.

9. The interface according to claim 1, wherein the control unit in response to receiving a request for 256 kilobit/second bandwidth places four calls over four of the plurality of U-channels.

10. The interface according to claim 1, wherein the control unit in response to receiving a request for 384 kilobit/second bandwidth places six calls over six of the plurality of U-channels.

11. The interface according to claim 1, wherein the control unit in response to receiving a request for 512 kilobit/second bandwidth places eight calls over eight of the plurality of U-channels.

12. An interface for interfacing a plurality of U-channels each corresponding to a single ISDN line received from a telephone company central office to a piece of terminal equipment, comprising:

a single wall jack comprising a plurality of pairs of pins, each pair of pins wired to one of the plurality of U-channels to receive a full-duplex U-channel signal from the telephone company central office;

a plurality of U-channel interfaces each coupled to one of the plurality of pairs of pins, wherein each U-channel interface converts data received from one of the plurality of U-channels into two data channels and a control channel;

an interface circuit coupled between the plurality of U-channel interfaces and the terminal equipment, wherein the interface circuit converts each of the data channels from each of the plurality of U-channel interfaces into a standard compatible with the terminal equipment; and a control unit, coupled to the interface circuit, which receives a request from the terminal equipment for a high bandwidth data channel and, responsive thereto, controls the interface circuit to use two or more of the plurality of U-channels to transmit data for the terminal equipment.

13. The interface of claim 12, wherein the plurality of pairs of pins comprises three pairs, and wherein the plurality of U-channel interfaces comprises three U-channel interfaces each coupled to one of the three pairs of pins.

14. The interface of claim 12, wherein the plurality of pairs of pins comprises four pairs, and wherein the plurality of U-channel interfaces comprises four U-channel interfaces each coupled to one of the four pairs of pins.

15. The interface of claim 12, wherein the interface circuit converts each of the data channels into the Multi-Vendor Interface Protocol standard.

16. The interface of claim 12, further comprising a premises wiring block which receives each of the plurality of U-channels from the telephone company central office and which is coupled to the single wall jack without passing through any interfacing equipment.

17. A method for wiring a building to accommodate high bandwidth data over a plurality of ISDN lines received from a telephone company central office, comprising the steps of:

(1) connecting a single wall jack to a premises wiring block, wherein the premises wiring block is coupled to the plurality of ISDN lines, wherein the single wall jack is wired to the premises wiring block through a plurality of pairs of wires, and wherein each of the plurality of pairs of wires in the single wall jack is directly connected to a corresponding one of the plurality of ISDN lines without being converted into an S/T channel;

(2) connecting the single wall jack to an ISDN interface unit which converts data received from each of the ISDN lines into a format compatible with videoconferencing equipment; and (3) transmitting data over two or more of the plurality of ISDN lines to achieve a data bandwidth of at least 256 kilobits per second.

18. The method of claim 17, wherein step (1) comprises the step of connecting the single wall jack to at least three ISDN lines, each corresponding to one of the plurality of pairs of wires, and wherein step (3) comprises the step of transmitting data over the at least three ISDN lines to achieve a data bandwidth of at least 384 kilobits per second.

19. The method of claim 17, wherein step (1) comprises the step of connecting the single wall jack to at least four ISDN lines, each corresponding to one of the plurality of pairs of wires, and wherein step (3) comprises the step of transmitting data over the at least four ISDN lines to achieve a data bandwidth of at least 512 kilobits per second.

20. The method of claim 17, further comprising the step of requesting a particular data bandwidth and, in response thereto, allocating enough of the plurality of ISDN lines to meet the particular data bandwidth and placing telephone calls over each of the plurality of allocated ISDN lines.

21. The method of claim 17, wherein step (2) comprises the step of wiring each of the plurality of ISDN lines from the single telephone wall jack through a surge protective network and through a U-channel interface which converts data from a U-channel format into two 64 kilobit per second data channels.

22. A building wired in accordance with the method of claim 17.

* * * * *